(12) United States Patent
Tan (10) Patent No.: US 11,729,468 B2
(45) Date of Patent: Aug. 15, 2023

(54) SYSTEM AND METHOD FOR DETERMINING THE LOCATION OF A USER DEVICE

(71) Applicant: TELUS Communications Inc., Vancouver (CA)

(72) Inventor: Peng Tan, Newmarket (CA)

(73) Assignee: TELUS Communications Inc., Vancouver (CA)

( * ) Notice: Subject to any disclaimer, the term of this patent is extended or adjusted under 35 U.S.C. 154(b) by 0 days.

(21) Appl. No.: 17/121,162

(22) Filed: Dec. 14, 2020

(65) Prior Publication Data
US 2022/0109916 A1   Apr. 7, 2022

(30) Foreign Application Priority Data

Oct. 1, 2020 (CA) ................................ CA 3094968

(51) Int. Cl.
| | | |
|---|---|---|
| *H04N 21/422* | (2011.01) | |
| *H04N 21/442* | (2011.01) | |
| *H04W 76/00* | (2018.01) | |
| *H04N 21/4627* | (2011.01) | |
| *H04W 76/11* | (2018.01) | |

(Continued)

(52) U.S. Cl.
CPC ......... *H04N 21/4627* (2013.01); *G06F 16/22* (2019.01); *H04N 21/2393* (2013.01); *H04N 21/25841* (2013.01); *H04N 21/436* (2013.01); *H04N 21/4524* (2013.01); *H04N 21/4532* (2013.01); *H04N 21/47211* (2013.01); *H04W 4/021* (2013.01); *H04W 12/06* (2013.01); *H04W 12/63* (2021.01); *H04W 12/72* (2021.01); *H04W 76/11* (2018.02); *H04W 88/16* (2013.01)

(58) Field of Classification Search
CPC .......... H04N 21/4627; H04N 21/2393; H04N 21/25841; H04N 21/436; H04N 21/4524; H04N 21/4532; H04N 21/47211; H04N 21/25816; H04N 21/42684; H04N 21/472; G06F 16/22; G06F 16/9537; H04W 4/021; H04W 12/06; H04W 12/63; H04W 12/72; H04W 76/11; H04W 88/16
See application file for complete search history.

(56) References Cited

U.S. PATENT DOCUMENTS

6,629,136 B1   9/2003   Naidoo
6,665,715 B1   12/2003   Houri
(Continued)

*Primary Examiner* — Alazar Tilahun
(74) *Attorney, Agent, or Firm* — Seed Intellectual Property Law Group LLP (57) ABSTRACT

Authenticating the location of a viewing device for receiving content includes storing a plurality of connection identifiers in a database, the connection identifiers being associated with a plurality of networking devices and a plurality of user accounts. A viewing device sends a request to access content which is received by a server. The request is associated with a user account. One or more first connection identifiers is selected from the database based on the user account to which the request is associated. A second connection identifier is obtained based on a connection between the viewing device and the server. It is determined if the second connection identifier matches one of the one or more first connection identifiers. Content is provided to the viewing device if the second connection identifier matches one of the one or more of the first connection identifiers.

20 Claims, 8 Drawing Sheets

(51) Int. Cl.
  *H04N 21/45* (2011.01)
  *H04W 4/021* (2018.01)
  *H04N 21/472* (2011.01)
  *H04N 21/436* (2011.01)
  *H04N 21/239* (2011.01)
  *H04W 12/06* (2021.01)
  *H04W 12/63* (2021.01)
  *G06F 16/22* (2019.01)
  *H04W 12/72* (2021.01)
  *H04N 21/258* (2011.01)
  *H04W 88/16* (2009.01)

(56) References Cited

U.S. PATENT DOCUMENTS

| | | | |
|---|---|---|---|
| 6,829,593 | B1 | 12/2004 | Ritter et al. |
| 6,976,171 | B1 | 12/2005 | Ritter et al. |
| 8,060,068 | B1 | 11/2011 | Mangal |
| 8,135,825 | B2 | 3/2012 | Wendling |
| 8,213,898 | B2 | 7/2012 | Choti et al. |
| 8,472,983 | B1 | 6/2013 | Kapoor et al. |
| 8,683,502 | B2 | 3/2014 | Shkedi et al. |
| 8,838,149 | B2 | 9/2014 | Hasek |
| 9,071,886 | B2 | 6/2015 | Shkedi |
| 9,078,035 | B2 | 7/2015 | Shkedi et al. |
| 9,271,024 | B2 | 2/2016 | Shkedi et al. |
| 9,351,053 | B2 | 5/2016 | Shkedi |
| 9,591,380 | B2 | 3/2017 | Shkedi et al. |
| 9,900,401 | B2 | 2/2018 | Hasek |
| 9,955,225 | B1 | 4/2018 | Wood |
| 10,070,200 | B2 | 9/2018 | Shkedi et al. |
| 10,219,043 | B2 | 2/2019 | Wood |
| 10,405,058 | B2 | 9/2019 | Shkedi et al. |
| 10,477,349 | B2 | 11/2019 | Sinha et al. |
| 10,516,755 | B2 | 12/2019 | Hasek |
| 2006/0030333 | A1 | 2/2006 | Ward et al. |
| 2011/0283333 | A1* | 11/2011 | Ukkadam ........ H04N 21/25841 725/131 |
| 2013/0097316 | A1* | 4/2013 | Bender .................... H04L 67/12 709/225 |
| 2013/0185552 | A1 | 7/2013 | Steer |
| 2016/0374044 | A1* | 12/2016 | Li ........................ H04L 65/1016 |
| 2022/0060350 | A1* | 2/2022 | Dimitrovski ........ H04L 12/2834 |

* cited by examiner

SYSTEM AND METHOD FOR DETERMINING THE LOCATION OF A USER DEVICE

BACKGROUND

Technical Field

The disclosed systems and methods relate to determining the location of a user device and, in particular, a system and method for in-home detection in a fixed wireless network.

Description of the Related Art

The increasing availability of high-quality wireless networks has made it more challenging for content providers to restrict access to content such as television services to a particular location, such as a user's home. Media service providers and distributors acquire content from content providers such as television networks and studios, and distribute the content to subscribers. As part of licensing and other agreements with content providers, media service providers or distributors, such as for example, pay TV operators, are required to restrict playback of assets and content based on rules and locations. Under these restrictions, some assets cannot be played on devices located in different jurisdictions and some assets cannot be played if the devices are outside of the subscriber's home. Technologies such as fixed wireless networks make it more challenging to enforce restrictions to ensure that a viewer is located in-home when viewing contents, because there is no physically wired connection from the operator to the subscriber's home location. This means that the access node does not have information of the physical line ID and port ID.

Attempts at solutions have used approaches such as location-based services or Wi-Fi-location protocols. These solutions have drawbacks. Location services such as GPS can have a significant drain on battery life, and do not provide information that would allow a system to determine the location of a subscriber relative to their home without access to other information which could be a privacy concern for the subscriber or may otherwise be unavailable to the service provider. Other solutions may require cellular or Wi-Fi access, which may not be accessible in remote locations and may not provide information that would allow a service provider to determine if the subscriber is at their home without sharing information which could be a significant privacy concern. Commonly used geo-fencing processes may not provide sufficient granularity to allow the services to determine when the user is at their home or another home in a similar area.

BRIEF SUMMARY

There is provided in one embodiment a method of authenticating the location of a viewing device for receiving content. A plurality of connection identifiers is stored in a database. Each of the plurality of connection identifiers is associated with a corresponding one of a plurality of networking devices and each of the plurality of networking devices is associated with one or more of a plurality of user accounts. A request from a viewing device to access content from a server is received. The request is associated with a user account. One or more first connection identifiers associated with the user account to which the request is associated is selected from the database. A second connection identifier of the plurality of connection identifiers is obtained based on a connection between the viewing device and the server. A determination is made whether the second connection identifier matches one of the one or more first connection identifiers. Content is provided to the viewing device if the second connection identifier matches one of the one or more of the first connection identifiers.

In various embodiments, there may be included any one or more of the following features of the method: the second connection identifier is obtained by extracting data from the request; the second connection identifier is included in the request; information identifying a networking device of the plurality of networking devices is obtained, and the step of obtaining the second connection identifier comprises selecting the second connection identifier from the database or a second database based on the second connection identifier being associated with the networking device identified by the identifying information; the information identifying the networking device is obtained by extracting data from the request; the information identifying the networking device is included in the request; the identifying information comprises one or more of an IP address, a serial number, or a media access control (MAC) address; the plurality of first connection identifiers are one of international mobile subscriber identities (IMSIs), international mobile equipment identities (IMEIs), MAC addresses, or a serial number of the networking device; the plurality of first connection identifiers are IMSIs; the networking device is a fixed wireless residential gateway; and receiving a request from a viewing device further comprises receiving access credentials from the viewing device, and in which the first connection identifier is associated with the access credentials.

There is provided in one embodiment a method of determining whether a user device is at a user's home. A plurality of connection identifiers is stored in a database. Each of the plurality of connection identifiers is associated with a corresponding one of a plurality of networking devices. Each of the plurality of networking devices is associated with one or more of a plurality of user accounts. At a server, a request is received from a user device for a transaction to occur. The request is associated with a user account. One or more first connection identifiers associated with the user account to which the request is associated is selected from the database. A second connection identifier of the plurality of connection identifiers is obtained based on a connection between the user device and the server. A determination is made whether the second connection identifier matches one of the one or more first connection identifiers. The requested transaction is allowed to occur if the second connection identifier matches the one or more of the first connection identifiers In various embodiments, there may be included any one or more of the following features of the method: the second connection identifier is obtained by extracting data from the request; the second connection identifier is included in the request; information identifying a networking device of the plurality of networking devices is obtained, and the step of obtaining the second connection identifier comprises selecting the second connection identifier from the database or a second database based on the second connection identifier being associated with the networking device identified by the identifying information; and the plurality of first connection identifiers are IMSIs.

There is provided in one embodiment a system for authenticating the location of a device. There are one or more databases configured to store a plurality of connection identifiers, each of the plurality of connection identifiers being associated with a corresponding one of a plurality of networking devices, each of the plurality of networking devices being associated with one or more of a plurality of user accounts. There are one or more servers configured to: receive a request from a device for a transaction to occur, the request being associated with a user account, select from the one or more databases one or more first connection identifiers associated with the user account to which the request is associated, obtain a second connection identifier of the plurality of connection identifiers based on a connection between the viewing device and a server receiving the request, determining if the second connection identifier matches one of the one or more first connection identifiers, and allowing the requested transaction to occur if the second connection identifier matches one or more of the first connection identifiers.

In various embodiments, there may be included any one or more of the following features of the system: the one or more servers is configured to obtain the second connection identifier by extracting data from the request; the one or more servers is further configured to obtain information identifying a networking device of the plurality of networking devices, and in which the one or more servers are configured to obtain the second connection identifier by selecting the second connection identifier from the one or more databases based on the second connection identifier being associated with the networking device identified by the identifying information; and the one or more servers being configured to receive a request from a device for a transaction to occur further comprises being configured to receive a request from a viewing device to access content from a server and in which the one or more servers being configured to allow the requested transaction to occur if the second connection identifier matches one or more of the first connection identifiers further comprises the one or more servers being configured to provide content to the viewing device if the second connection identifier matches one of the one or more of the first connection identifiers.

These and other aspects of the system and method are set out in the claims, which are incorporated here by reference.

BRIEF DESCRIPTION OF THE SEVERAL VIEWS OF THE DRAWINGS

Embodiments will now be described with reference to the figures, in which like reference characters denote like elements, by way of example, and in which.

DETAILED DESCRIPTION

In an embodiment there is a method of allowing a content service provider to detect whether a customer-premises equipment (CPE) is out-of-home or in-home using a connection identifier such as an international mobile subscriber identity (IMSI).

In embodiments of the method and system for authenticating the location of a user device, it is not necessary to use cellular bearer/access to identify the location of a user. Similarly, it is not necessary to know the location of the device. Instead, embodiments of the system and methods determine whether or not the device is at a specific location, such as the user's home. The in-home or out-of-home status is determined using a connection identifier for the user's networking device which is stored in the operator's databases.

In an embodiment, there is disclosed a method and system for enforcing viewing restrictions for TV services over 4G LTE and 5G fixed wireless access networks. Viewing restrictions may be enforced if a subscriber consumes content out of home.

Figure 1:
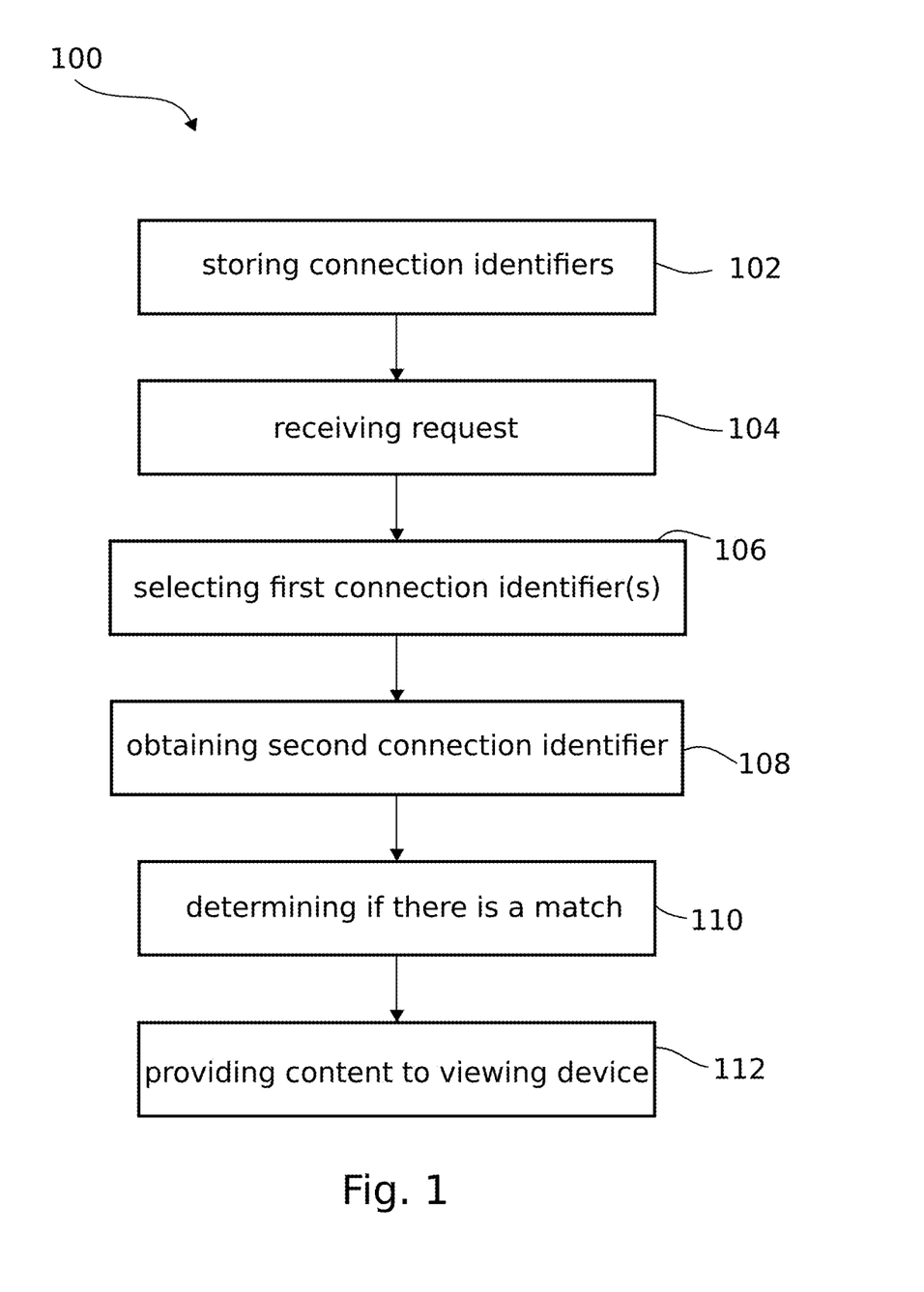
FIG. 1 is a flow chart of a method of authenticating the location of a viewing device for receiving content.

As shown in FIG. 1, in an embodiment there is disclosed a method 100 of authenticating the location of a viewing device for receiving content. FIG. 1 is a general diagram depicting a method enabling the in-home detection over wireless in accordance with an exemplary embodiment.

At 102, a plurality of connection identifiers is stored in a database. Each of the plurality of connection identifiers is associated with a corresponding one of a plurality of networking devices.

The plurality of connection identifiers may be any identifier that is uniquely associated with the corresponding networking device. Various different connection identifiers may be used, including, for example: international mobile subscriber identities (IMSIs), international mobile equipment identities (IMEIs), Dynamic Host Configuration Protocol (DHCP) option 82, MAC addresses or serial numbers of the networking devices. In a preferred embodiment, IMSI is used, but in different implementations, other connection identifiers are also possible. In some cases, multiple connection identifiers may be used for the same networking device. In an embodiment shown in FIG. 4, the plurality of first connection identifiers are IMSIs. The IMSI is a number that uniquely identifies every user of a cellular network. It is stored as a 64-bit field and is sent by the networking device to the network. For LTE and 5G networks, this number is provisioned in the SIM card. An IMSI is usually presented as a 15-digit number. The first 2 digits represent the mobile country code (MCC), which is followed by the mobile network code (MNC). The remaining digits are the mobile subscription identification number (MSIN) within the network's customer base.

The networking device may be any system that provides an internet signal or any value-added network services and may be a fixed wireless residential gateway. The fixed wireless access network may be any system that provides an internet signal or any value-added network services to a fixed location via radio waves transmitted by a base station, such as a phone, IPTV, high speed Internet, home security, etc.

In one embodiment, a connection identifier may be the IMSI of a networking device such as a customer-premises equipment. Each of the plurality of networking devices is associated with one or more of a plurality of user accounts. The user accounts may be any accounts that are used by subscribers to access content. The content includes media content, Internet content, or any subscribed content, etc. More than one user account may be associated with one networking device, for example, if multiple subscribers live at the same residence, and a user may have multiple accounts which are associated with different networking devices. At 104, a request from a viewing device to access content from a server is received. The request is associated with a user account. The request may include a transmission of access credentials from the viewing device. For example, the access credentials may be a username and password associated with the subscriber which are entered or stored on the viewing device. Various other access credentials may be used to verify that the subscriber is authorized to receive content. Any type of access credentials may be used so long as the system can verify that the subscriber is authorized to access the content. The request may be an attempt by a user to access content from a server.

At 106, one or more first connection identifiers associated with the user account to which the request is associated is selected from the database. A user account could be associated with multiple 'at-home' networks, and so the user account could be associated with multiple 'at-home' locations. For example, the subscriber having credentials to access content may be registered in the database with multiple networking devices at separate locations. The database would then store the connection identifier(s) associated with those multiple networking devices. The first connection identifier may be associated with the access credentials in the database. At 108, a second connection identifier of the plurality of connection identifiers is obtained based on a connection between the viewing device and the server. The second connection identifier may be obtained directly by extracting data from the request, for example, by being included in the request. The second connection identifier may also be obtained indirectly by obtaining information from other data extracted from the request or based on other information obtained about the connection between either the viewing device and the server or the networking device and the server, or from other known information or obtainable information about the networking device.

At 110, it is determined if the second connection identifier matches one of the one or more first connection identifiers. At 112, content to the viewing device is provided if the second connection identifier matches one of the one or more of the first connection identifiers.

If the second connection identifier cannot be extracted from the request, the second connection identifier may be obtained through separate information contained in the request or separately from information that identifies a specific networking device. For example, information identifying a networking device of the plurality of networking devices may be obtained, for example, from the request. The identification information can include one or more of an IP address, a serial number or a media access control addresses (MAC address) or other identification information that identifies a specific networking device. The step 108 of obtaining the second connection identifier may further comprise selecting the second connection identifier from the database or a second database based on the second connection identifier being associated with the networking device identified by the identifying information. For example, a database may store the IP address or serial number associated with a networking device and provide the IMSI or other connection identifier for the networking device if a query is made based on a particular IP address or serial number associated with the networking device. The information identifying the networking device may be obtained by extracting data from the request or, for example, by being included in the request.

The method shown in FIG. 1 may be used in broader applications than just determining the location of a subscriber requesting access to television content. For example, the method may be used to determine whether a user device is at a user's home, regardless of the type of transactions being requested by the user. At 104, the request may be a request for a transaction to occur, such as a transaction in the e-commerce domain. The verification that a device is in-home or out-of-home could be used as a marker of whether a transaction is fraudulent for the purposes of combating fraud. An e-commerce provider or bank could use information of whether the transaction is initiated from the subscriber's home or a separate location. The information about the location of the device could be used as a reference to validate the authenticity of an online purchase. The method would allow the requested transaction to occur if the second connection identifier matches the one or more of the first connection identifiers. Determining that a user is in-home may be used as a strong indicator that a transaction is valid.

Although the terms 'in-home' and 'out-of-home' are used throughout this patent document to describe the specific location of the networking device, the system and methods disclosed can be used to identify locations other than a user's home. For example, in some embodiments, the location may determine that a device is at any specific location, such as a particular workplace, regardless of whether that location is the user's home or any other person's home. The specific location may be any location in which the fact that the user is at the location is relevant to whether to allow the user to access information or cause a transaction, or any other step, to occur. The methods and systems disclosed herein may be used not only for provisioning content but also in other settings where authentication of location is beneficial, such as in an e-commerce setting. The specified location could be a home, a workplace, or any other specific location. For example, as fixed wireless networks become more common, the systems and methods disclosed herein can be used to determine whether access to certain information is provided based on whether the device in question is associated with a particular location. The knowledge of the location device could be used to combat fraud. For example, an e-commerce provider or bank might want to know whether a transaction is initiated from a user's home or other specific location. The location information associated with the device could be used a reference to validate the authenticity of an online purchase or banking transaction.

Figure 2:
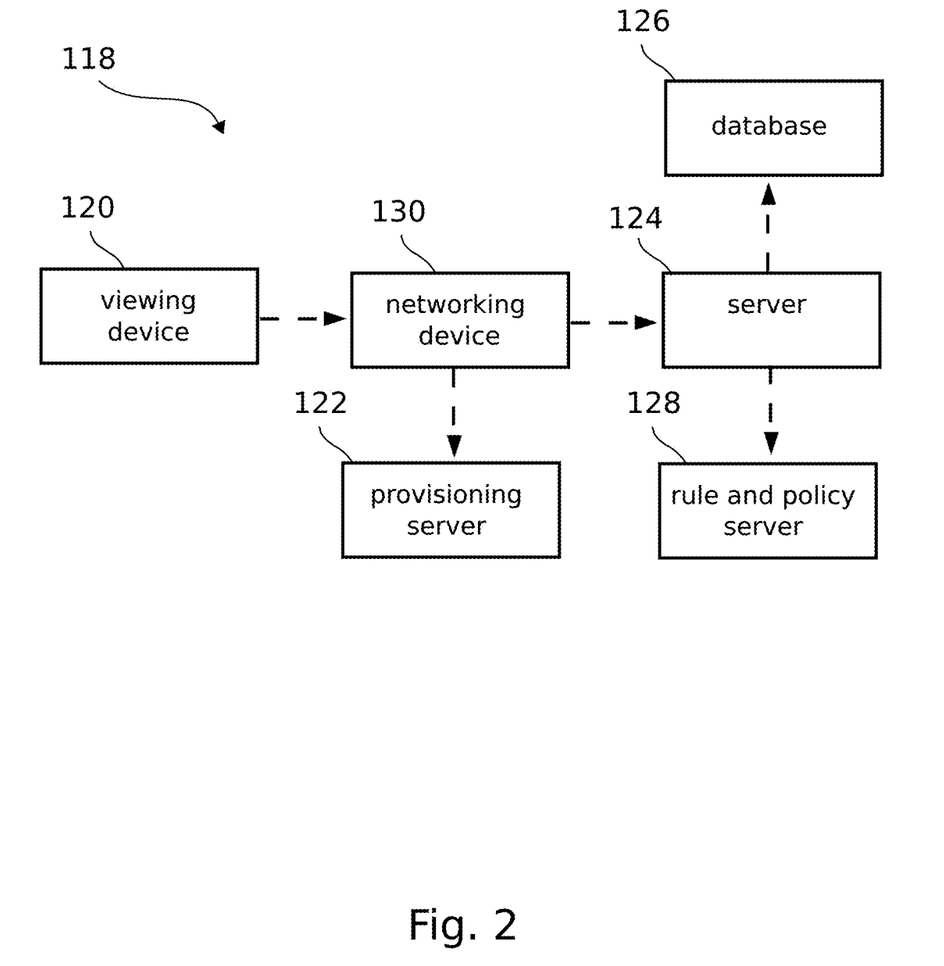
FIG. 2 is schematic view of a system for authenticating the location of a device.

As shown in FIG. 2, there is a system 118 for authenticating the location of a subscriber device 120. There are one or more databases 126 which are configured to store the plurality of connection identifiers. There are one or more servers configured to carry out the method. For example, as shown in FIG. 1, there are three servers, including a provisioning server 122, a service server 124, and rule and policy server 128. Depending on the application, the functions provided by these servers may be provided by a single server, or may be provided by separate servers. The servers may be located in the same physical location or in vastly different geographical areas. The subscriber device 120, which may be a viewing device or any other connected devices, connects to a network through a networking device 130. A subscriber may use the networking device 130 to consume a piece of media content. The networking device may be any user equipment that provides access to a network and may include a combination of one or several indoor or outdoor on-premise equipment. The networking device may be a customer-premises equipment (CPE), or could be another piece of hardware that allows the subscriber device 120 to connect to a network. For example, the networking device could be one or a combination of wireless modem, home residential gateway and set-top box (STB). In one embodiment, the viewing device is a STB and an in-home detection client, or provisioning server 122, runs on the STB to enforce the in-home detection policy. The networking device may be permanently or semi-permanently installed in or near the home of the subscriber. The viewing device checks with the one or more servers to determine if it is connected to the customer-premises equipment 130 affixed to the subscriber's home location. Embodiments of this system allow for accurate assessment of whether the subscriber is in-home versus out-of-home.

If the user watches a channel with in-home detection restriction, the STB, or any viewing device or connected devices which is enforced by certain location restrictions, will issue a request to confirm the viewing device's in-home status. If the viewing device is determined to be at home, the subscriber is then allowed to watch that piece of content. Otherwise, if the viewing device is determined to be out of home, the subscriber cannot watch that piece of content. In other embodiments, the in-home detection client could run on the residential gateway or the 4G/5G indoor or outdoor units.

In the case of outdoor deployment of 5G CPE, the 3.5 GHz and 28 GHz outdoor unit (ODU), and certain Long-Term Evolution (LTE) modem will be mounted on the roof or outdoor wall. It does not travel with the subscriber. However, the viewing devices 120 are usually portable, not fixed to the house and so can travel with the subscriber. The embodiments of the method and system may be used to preclude the subscriber from watching content with in-home restrictions if their viewing devices are determined to be out-of-home.

The provisioning server 122 may be used to provision the user to access the network and the pay-TV system. The provisioning process might include a few procedures to authenticate the subscriber to access the content in the pay-TV system using access credentials. In one procedure, the provisioning system will record the subscriber's connection identifier into the system database 126.

The server 124 may serve in-home detection requests from the networking device 130. The server 124 may check the request header to obtain connection identifiers and account information if those exist. Otherwise, the server 124 will request the required connection identifier from, for example, a rule and policy server 128. The rule and policy server 128 conducts mapping between the subscriber's connection identifier information with its identification information of the networking device, such as physical ID, such as IP address, MAC address or serial number.

In an embodiment, the method and system may be used to provision a TV account for a high-speed internet access (HSIA) subscriber. A certain data field is recorded in an identity database associated with the TV account. The data field will be used by an API instance to determine the HSIA connection type associated the account. The IMSI information for the connection, for example, the IMSI of an outdoor unit, may be included in the identity database field and be retrievable by account ID. The IMSI information is used to determine the in-home or out-of-home status of the account's viewing devices.

If the HSIA subscriber is re-provisioned with a different IMSI, the identity database may be updated with the new IMSI value. If the subscriber is no longer subscribing to the TV service, the account may be deleted from the identity database. A format with a prefix and an identifier value, such as "imsi:<IMSI value>" where "imsi" is an example of the prefix, and the "<IMSI value>" is an example of an identifier value, may be used to write the required data field to the same identity database as regular service provisioning database to avoid changes in the provisioning application programming interface.

Figure 3:
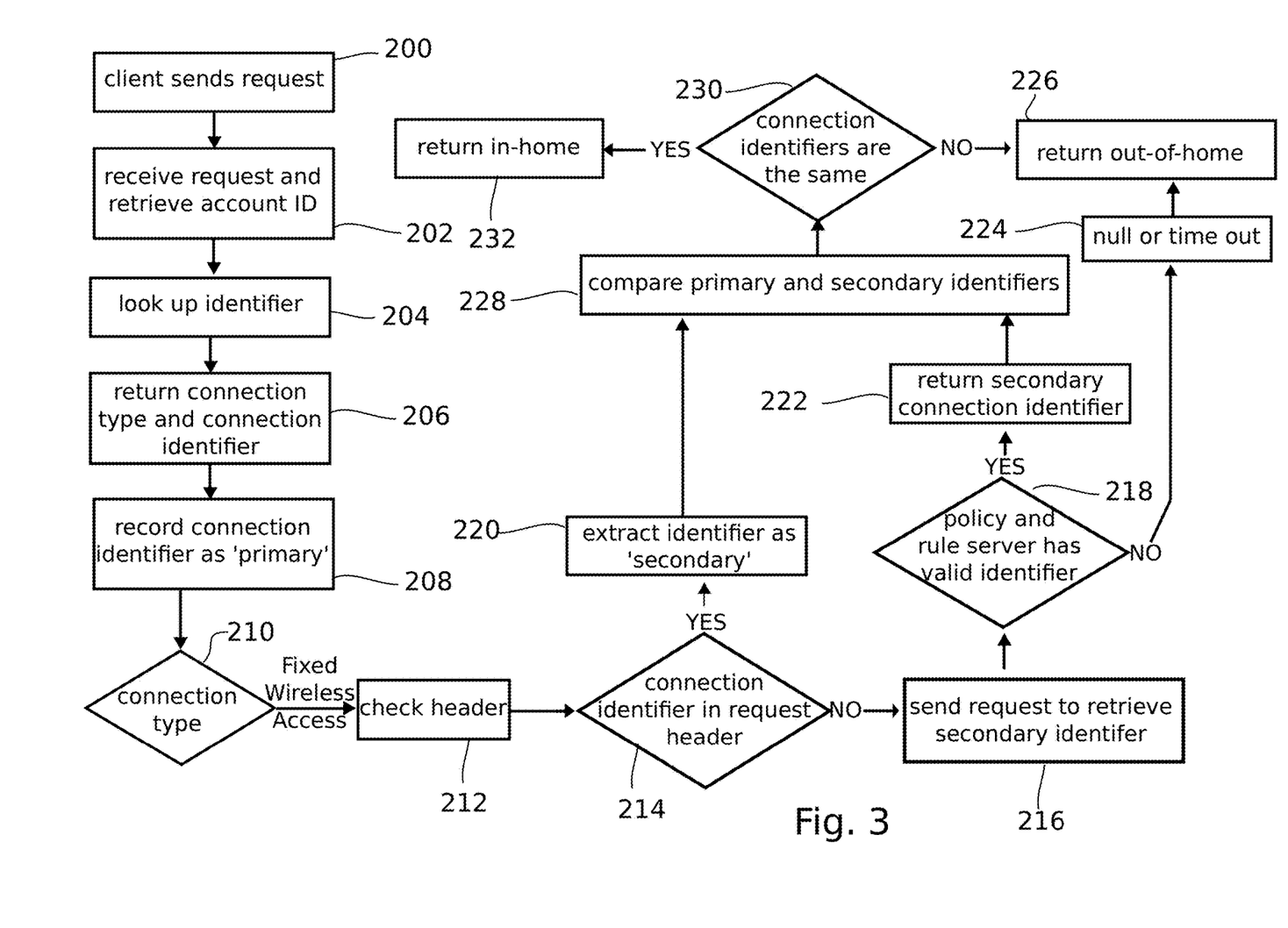
FIG. 3 is a flow chart of a method of determining the in-home status of a user device.

FIG. 3 is a flow diagram depicting an embodiment of a method of determining the in-home status of a device. In 200, a client residing on the networking device 130 (FIG. 2) sends a request to the server 124 (FIG. 2) to validate if the subscriber's viewing device 120 (FIG. 2) is in-home or out of home. Once the request is received, typically after certain authentication process involving a token validation or exchange of other access credentials, the server 124 (FIG. 2) processes the request. The server 124 (FIG. 2) retrieves access credentials, such as the account ID, from the request. At 202, the server receives the request and retrieves the account ID from the in-home detection request URL. In an example, the account ID could be retrieved from the request URL. At 204, the server then sends a query to database 126 (FIG. 2) to look up the provisioned connection identifier associated with the account ID from the provisioning database.

During the provisioning process, which usually happens when the networking device is installed and before the subscriber can use the networking device, at home, a connection type and connection identifier associated with the networking device may be recorded in the operator's database 126 (FIG. 2). If the account identifier or other access credentials are valid and has been provisioned in the provisioning system 122 (FIG. 2), the database will return the connection type and primary connection identifier to the server 124 (FIG. 2).

In operation 206, the provisioning database returns the connection type and the provisioned connection identifier associated with the account ID. The service server then in operation 208 records the provisioned connection identifier as the "primary" connection identifier.

In 210, once the service server determines that the subscriber's connection type is fixed wireless access, it then in operation 212 checks if the header of the in-home detection request includes a connection identifier. For example, HTTP header enrichment allows mobile operators to annotate HTTP connections via the use of a wide range of request headers. In 214, if the connection identifier is already included in those request headers, the service server will extract the connection identifier and record it as the 'secondary' connection identifier in 220. The service server in 228 compares the primary connection identifier with the secondary connection identifier. In 230, if the primary connection identifier is equal to the secondary connection identifier, the service server returns to the request with the 'in-home' status and 'out-of-home' status in 232 and 226, respectively.

In 214, if the connection identifier is not in the request header, the server sends a request to the policy and rule server 128 (FIG. 2) where the IMSI information could be queried based on the networking device identification, such as for example, IP address, serial number or MAC address. In this case, the service server 124 retrieves the secondary identifier in operation 216. If the request is determined to be valid in operation 218, the policy and rule server will return the secondary connection identifier in operation 222 to the service server. The service server will then in operation 224 compare the primary connection identifier with the secondary connection identifier. If they are determined to be equal in operation 230, the service server will return 'in-home' in operation 232, otherwise 'out-of-home' in operation 226. If the policy and rule server does not have a valid secondary connection identifier to report in 218, it will return null or timeout to the service server in operation 224. The service server then determines the viewing device is out-of-home in operation 226.

Once the authentication process is completed, the subscriber may receive a status update on the viewing device about the status of the device as either out-of-home or in-home. If the status of the device is determined to be out-of-home, a notification associated with the playback service may be displayed on the subscriber's screen that includes a message that indicates that playback is only available when connected to the subscriber's at home internet.

Figure 4:
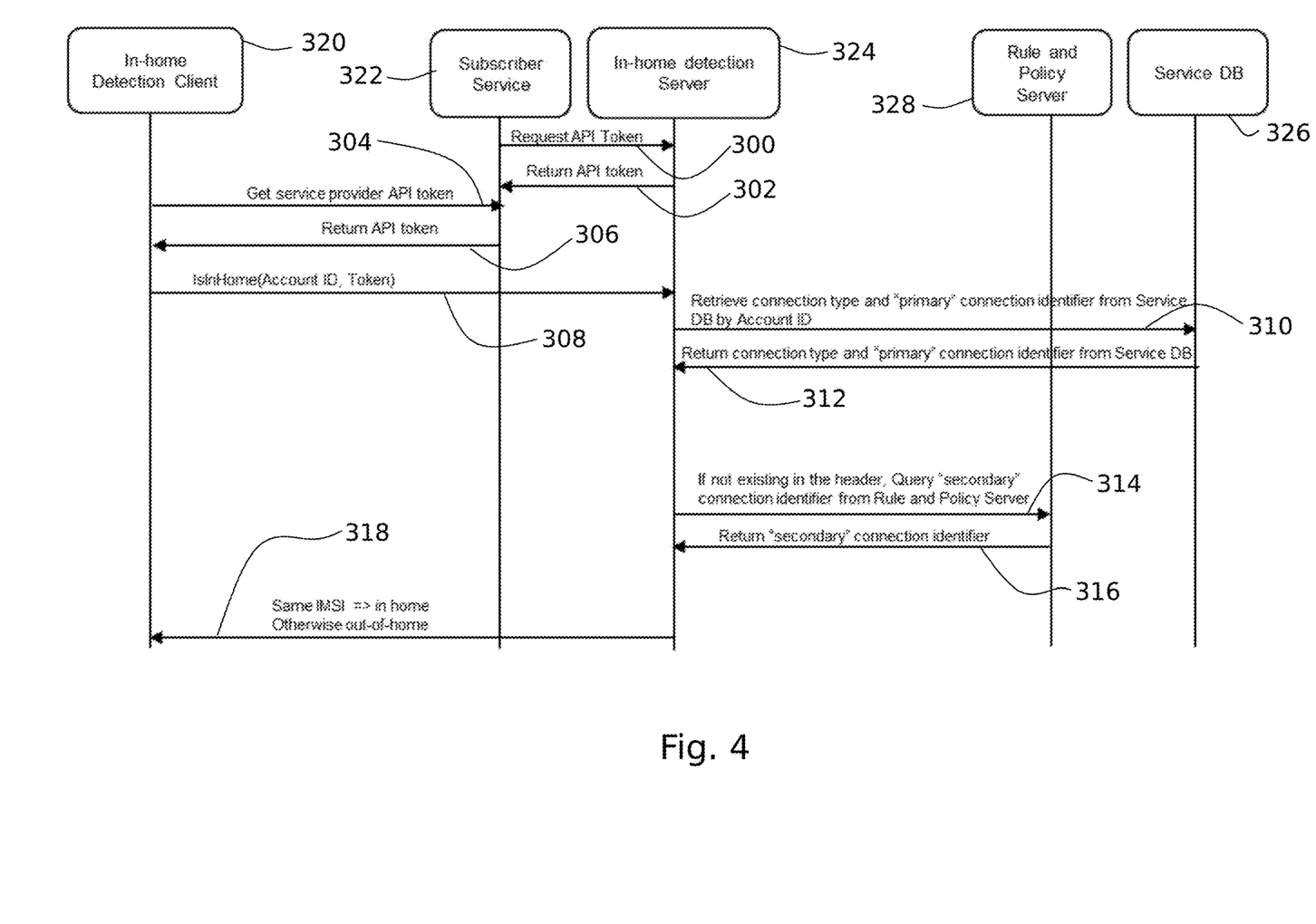
FIG. 4 is a call flow diagram showing in-home detection for a wireless network.

FIG. 4 is an exemplary call flow of in-home detection over a fixed wireless network. At an initial stage, the connection type and connection identifier related to the networking device is written into a service database 326. A subscriber service 322 requests an API token from an in-home detection server 324 at 300. The API token is returned at 302. An in-home detection client 320 requests the service provider API token at 304 and the API token is returned at 306. At 308, the client 320 sends access credentials, such as Account ID and token, to the in-home detection server 324. At 310, the in-home detection server 324 then retrieves the connection type and 'primary' connection identifier from the service database 326 based on the corresponding account ID. The 'primary' connection identifier may be the IMSI of the networking device associated with the account ID. At 312, the connection type and 'primary' connection identifier are returned from the service database 326. If the connection identifier can be extracted from the request, then the IP and connection identifier are extracted from the API call header. If the information is not contained in the header, then at 314 a 'secondary' connection identifier is queried from a rule and policy server 328. The rule and policy server 328 returns the 'secondary' connection identifier at 316. The in-home detection server then compares the 'primary' connection identifier with the connection identifier that was extracted from the header or the 'secondary' connection identifier from the rule and policy server at 318. If the connection identifiers from the stored database information and the extracted information from the specific connection are the same, then the status of 'in-home' is determined, otherwise, the status of 'out-of-home' is returned.

Figure 5:
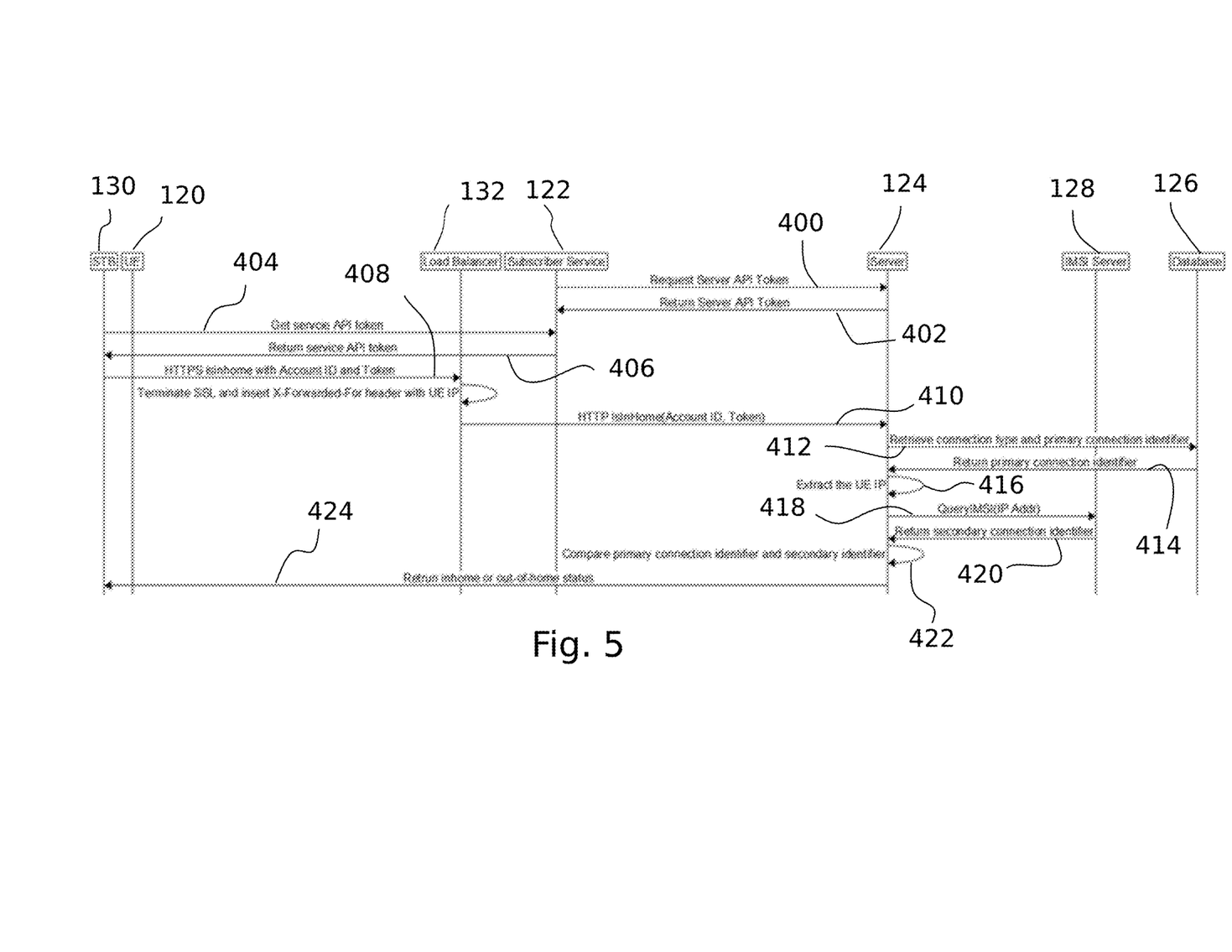
FIG. 5 is a call flow diagram to determine whether a viewing device is in-home or out-of-home.

In FIG. 5, the viewing device 120 (FIG. 1) may be a Set-Top-Box (STB) or Client that is a piece of software or hardware AV player. The networking device 130, or User Equipment (UE), may be a wireless modem, residential gateway, router, or a combination of these devices. A Load Balancer 132 is a network element designed to balance API call or network traffic. Subscriber service 122, or provisioning server, stores IPTV subscription information and provides user authentication. The server 124 is used to respond to STB or client queries about whether the viewing device is in-home or out-of-home. The IMSI server 128 provides the IP address and IMSI mapping. The IMSI server 128 responds to a query to return the connection identifier, in this case, the IMSI of the networking device, based on the IP address provided by server. The database 126 stores the IPTV subscriber's connection type and primary connection identifier.

At 400, the subscriber service 122 first gets the API token for the subscriber. The STB may request the API service directly from the server or through a proxy from the subscriber service. In the embodiment in FIG. 5, the subscriber service requests the server API token from the server at 400, which is returned to the subscriber server at 402. A get request for the API token is sent from the set top box to the subscriber service at 404 and then returned to the set top box at 406. The subscriber service proxy is used when the IPTV control system is provided via a third-party software as a service (SaaS). When the STB or client boots up or the network condition changes, the STB will send a request to query its status whether it is in-home or out-of-home at 408. In the system where over-the-top connection is used, usually, the request will be in HTTPs. In that case, the Load Balancer will terminate the HTTPS request, and extract the UE IP address from the original HTTPs request, and insert it in the X-Forwarded-For header at 408, and forward the same request in HTTP at 410. Once the server 124 receives the HTTP request, it will authenticate the request based on the Token. If the token has been authenticated, it will use the Account ID in the request to retrieve connection type and primary connection identifier from Database at 412. In 414, the database 126 returns the primary connection identifier.

In 416, the Server extracts the UE IP which has been inserted by the Load Balancer in the X-Forwarded-For header. It then uses the IP address as an index to query at 418 the IMSI from the IMSI server 128. The IMSI server then returns at 420 the secondary connection identifier. The server then compares the primary identifier and secondary identifier at 422. In 424, if the two identifiers are the same, it determines that the STB/Client or viewing devices must be at home. If the two identifiers are different, the server responds "out-of-home" to the STB/client viewing device.

Figure 6:
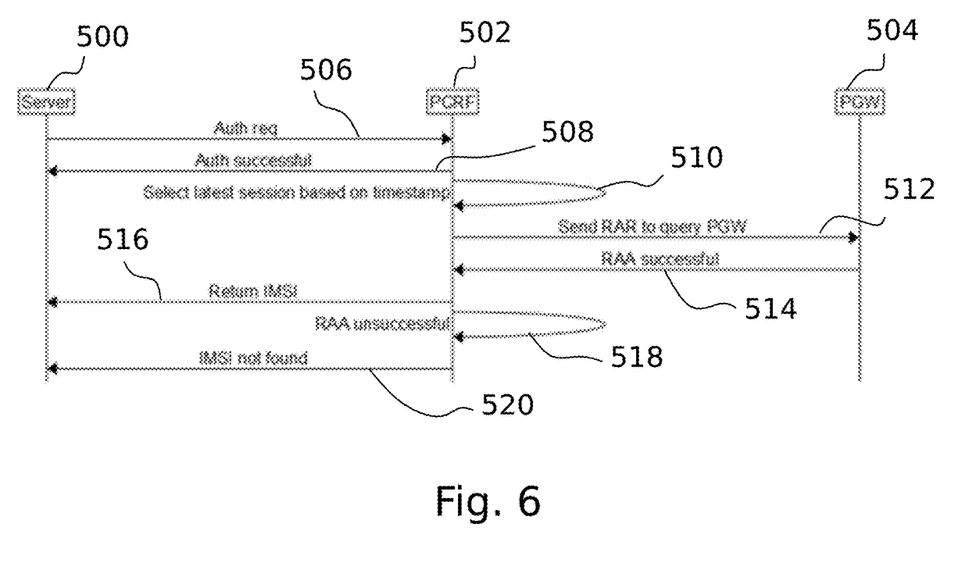
FIG. 6 is a call flow diagram to determine whether a viewing device is in-home using a policy and charging rules function to obtain the secondary connection identifier.

There are several methods to acquire connection identifiers. In the embodiment shown in FIG. 6, the IMSI Query service is hosted on policy and charging rules function (PCRF) 502. In this call flow, the PCRF determines if a server request from a server 500 with IP address is valid or not by sending a request at 506 and receiving a confirmation of successful authorization at 508. PCRF then selects the latest session based on the timestamp at 510. Over Gx interface, the PCRF then sends Re-Auth-Request (RAR) to look for the IP address from the Packet Data Network Gateway (PGW) 504 at 512. If the IP address exists is from the IP address assigned by PGW, PGW will send RAA successful with the IMSI matching the requested IP address at 514. The PCRF then returns the IMSI to the requested instance at 516. Otherwise, if the PCRF RAA session is not successful at 518, the PCRF will report the requested instance that the IMSI is not found for the requested IP address at 520.

In yet another embodiment, in a 5G SA architecture, the server could query Policy Control Function (PCF) via Npcf interface, and PCF could relay the request to Session Management Function (SMF) via Nsmf interface to retrieve a 5G identifier information from session management in SMF. The 5G identifier could be a Subscription Permanent Identifier (SUPI), Subscription Concealed Identifier (SUCI), Permanent Equipment Identity (PEI), Generic Public Subscription Identifier (GPSI), or the Globally Unique Temporary Identifier (GUTI).

Figure 7:
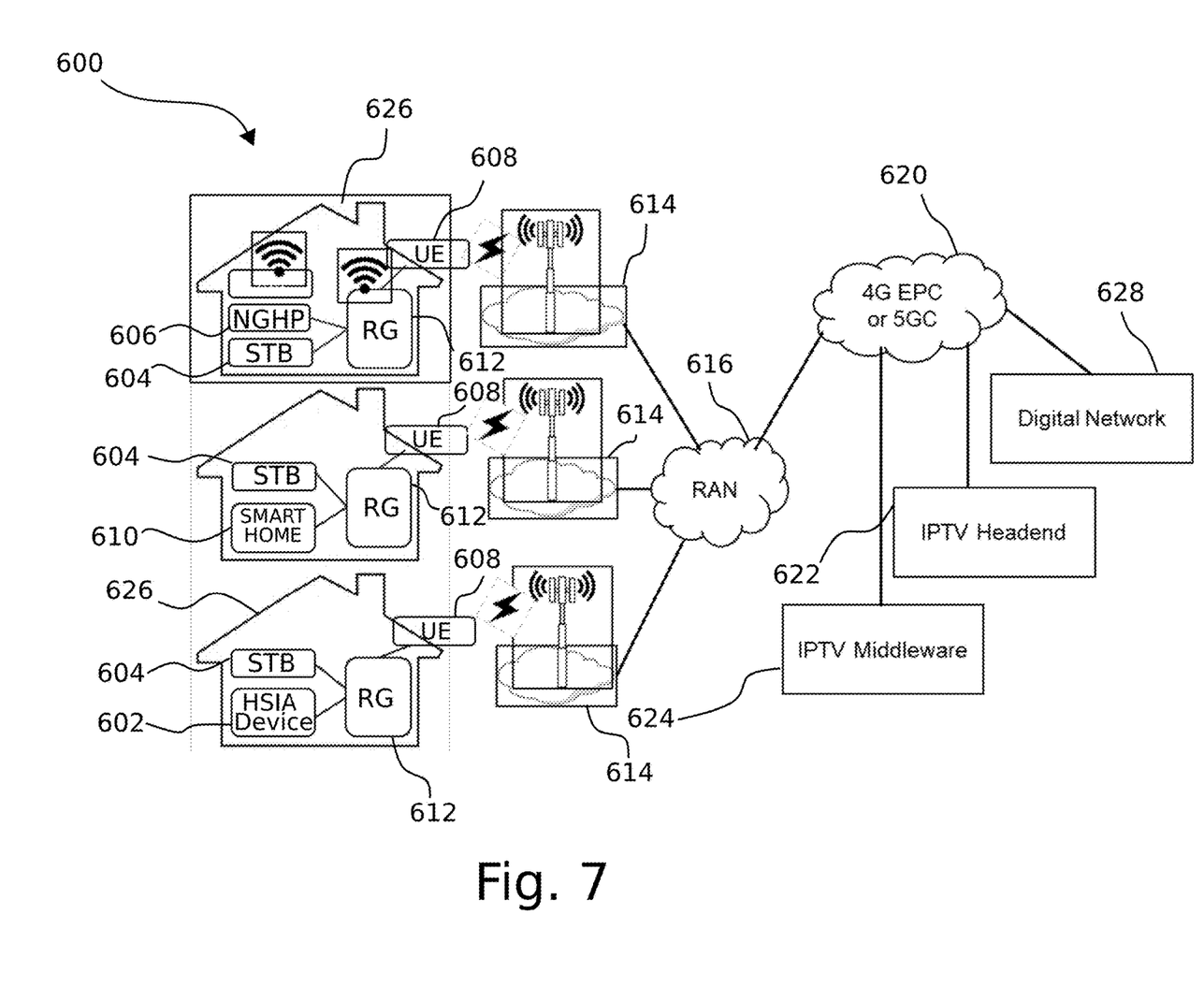
FIG. 7 is a schematic diagram showing components for provisioning IPTV services through a fixed wireless access infrastructure.

Fixed Wireless Access (FWA) uses wireless connectivity to provide end-users last mile access to telecommunications services. FIG. 7 depicts a system 600 where IPTV services could be delivered by FWA so that the consumer can have the same service even at the area where a wired connection is not available. The 'fixed' user equipment (UE) 608 could be a wireless modem, router, home gateway, or the combination of them. In this diagram, the UE 608, via LTE radio access or 5G NR radio access 614, 616, connects to the 4G EPC or 5G network core 620, and the rest of digital networks 628 and IPTV networks, including IPTV Headend 622 and IPTV Middlewear 624. Home devices, STB 604, home phone 606, high-speed internet access devices 602, as well as smart home devices 610 may be attached to the residential gateway (RG) 612 in a Wi-Fi or a wired connection at various homes 626. The application functions, for example, IPTV application functions can be exposed via Application Function (AF) in network core 620. The IPTV Headend and IPTV Middleware provide TV services by using multicast delivery, unicast delivery or a combined multicast adaptive bit rate (ABR) delivery.

Fixed wireless access is different from Wi-Fi. FWA service deployment in a 4G or 5G network has a wider coverage. Depending on the radio band to carry the fixed wireless signal, one fixed wireless base station coverage could be up to 10 kilometers or more, while the Wi-Fi hot spot could only provide local coverage, usually less than 100 meters.

Fixed wireless access could use various radio access technologies (RAT), such as GSM, UMTS, LTE or 5G NR.

Figure 8:
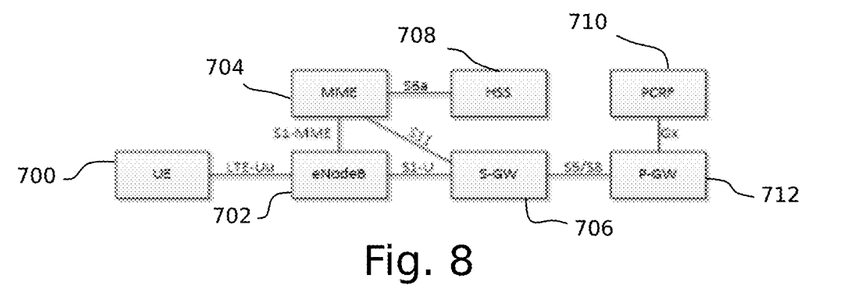
FIG. 8 is a schematic diagram showing a system of interfaces between network elements in a 4G LTE system for authenticating the location of a device.

One example where LTE is used to connect a fixed LTE UE to the network core is shown in FIG. 8, as standardized in 3GPP specifications TS 23.002, TS 23.401, and TS 23.402.

As shown in FIG. 8, the Evolved UMTS Terrestrial Radio Access Network (E-UTRAN) or LTE radio technology is used to connect a fixed LTE user equipment (UE) 700 to the 4G Evolved Packet Core (EPC). The EPC provides control signaling and establishes bearer to carry the IP packets, and route them to the proper network elements. There are several network elements in the EPC. A PDN Gateway (P-GW) 712 allocates IP address for UE, and enforces QoS and charging functions rules from PCRF 710. The PDN Gateway serves as the interface between the LTE network and other packet data networks. A Serving Gateway (S-GW) 706, on the other hand, acts as the local mobility anchor for the data bearers while UE is moving between eNodeBs 702. A Mobility Management Entity (MME) 704 processes the signaling between UE 700 and the EPC, and manages session states. A Home Subscriber Server (HSS) 708 stores user subscription data, and is responsible for user authentication and access authorization. Interfaces between these network elements are defined in various 3GPP standards.

Figure 9:
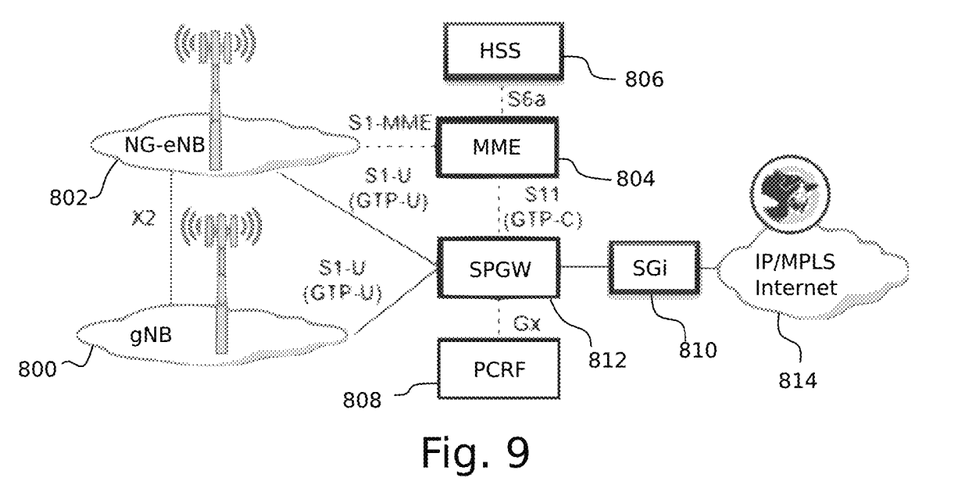
FIG. 9 is a schematic diagram showing a system for distributing wireless access technologies in a 5G new radio NSA (non-standalone) deployment.

In another embodiment, a mixed deployment of LTE and New Radio (NR) is depicted in FIG. 9. To leverage existing deployment of the 4G LTE network, 5G Non-standalone (NSA) will be the initial deployment solution most of the operators in the world adopt. In the 5G NSA as shown in FIG. 9, a NR gNB 800 is introduced into RAN, while the LTE Evolved Packet Core (EPC) will continue to be used to serve the RAN network. The control plane signaling will be first anchored on an LTE NG-eNB 802 base station. Once the default bearer has been established, the user plane data transmission could be camped on LTE only, including Mobility Management Entity (MME) 804 and Home Subscriber Server (HSS) 806, split between NR and LTE, or completely on NR base stations, depending on the base station distribution. The New Radio (NR) gNB 800 and NG-eNB 802 connect to 5G NR infrastructure including SPGW 812, PCRF 808 and SGi 810 which provides a connection to the Internet 814. In the future evolution, instead of EPC, a dedicated 5G Core (5GC) will be deployed in the Standalone (SA) deployment option.

Advanced radio technologies in 5G New Radio (NR) could enable 10~100× capacity improvement when compared with previous generations of wireless access technologies. Similar to LTE, 5G NR still uses Orthogonal frequency-division multiplexing-based (OFDM-based) waveforms, including Cyclic prefix OFDM (CP-OFDM) for spectral efficiency and DFT-S-OFDM for power efficiency, to cope with frequency selectivity propagation environments. In the uplink, Single-Carrier Frequency Division Multiple Access (SC-FDMA) technology such as DFT-S-OFDM has been provided as an option to achieve a signal waveform with smaller power variations in order to mitigate high peak to average power ratio (PAPR). Carrier aggregation, massive Multiple Input, Multiple Output (MIMO), beamforming, and CoMP play important roles in the NR to achieve significant throughput improvement.

NR is designed to support a wide range of operation bands from low band (below 1 GHz), 3-5 GHz band, to mmWave band as high as 28 GHz and 40 GHz. A variety of channel bandwidths within these bands and multiple deployment options have to be defined to accommodate a diversity of service types from high throughput enhanced Mobile Broadband (eMBB) service, low latency Ultra-Reliable Low-Latency Communication (URLLC) service, to the massive Machine Type Communications (mMTC) with high density of connections each with low bandwidth. Unlike LTE where only one 15 KHz subcarrier spacing (SCS) is specified, the NR introduces flexible SCS from 15 KHz, to 30 KHz, 60 KHz, 120 KHz and 240 KHz. This provides the scalability to deploy, for example, 120 KHz SCS in mmWave band, while 15 KHz SCS in outdoor macro coverage at 700 MHz band. To further support very low latency for critical data communications, NR also supports mini-slot with a duration as low as two OFDM symbols while a normal slot could occupy either 14 or 12 OFDM symbols.

In addition, 5G will enable ubiquitous connectivity with the introduction of the heterogeneous network (HetNet) architecture where macrocells, microcells, small cells, and relays are used to address the challenges in density with a massive number of connections, wide-coverage, and low latency.

Integrated Access Backhaul (IAB) in 3GPP Rel 16 also brings the fiber-less 5G possible so that 5G radio could be deployed into locations where no fiber backhaul is available.

Figure 10:
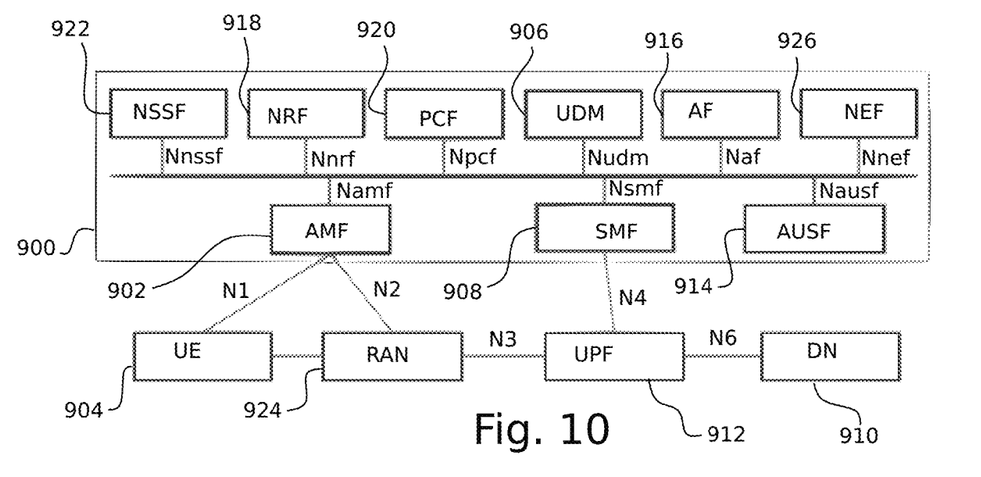
FIG. 10 is a schematic diagram showing a system for providing authentication of the location of a device in a 5G SA (Stand-Alone) system.

In another embodiment, the 3GPP 5G System (5GS) defines a service-based architecture as shown in FIG. 10. HTTP2 protocol will be used to replace all Diameter, domain name system (DNS), and most GPRS tunneling protocol (GTP) interfaces. It also separates control plane functions and user plan functions. Control plane functions 900 are shown in a service-based representation. For example, Npcf refers to an interface to allow other network functions to access PCF services, regardless of the context.

In a typical session setup procedure, an access and mobility management function (AMF) 902 is selected by the radio access network to receive the user equipment (UE) 904 registration request. To serve this request, AMF 902 will query the unified data management (UDM) 906 via the Nudm interface to get the UE subscription information. After the UE control plane connection is established, the Session Management Function (SMF) 908 will be involved to complete the radio network resource set-up via N2, N3, and N4 interfaces until an end-to-end PDU session from UE 904 to the data network (DN) 910 via User Plane Function (UPF) 912 and interface N6 is established.

In the embodiment shown in FIG. 10, Authentication Server Function 914 (AUSF) is responsible for the authentication function of 4G LTE HSS. The network exposure function (NSF) support function exposure, such as application function (AF) 916 and edge computing functions. The network repository function (NRF) 918 on the other hand supports service discovery. The Policy Control Function (PCF) 920 performs similar functionality as the PCRF in LTE EPC which supports a unified policy framework and provides policy rules to control plane functions to enforce them. A more detailed description of the 5GS core functions, procedures and policy and charging control framework can be found in 3GPP standards TS 23.501, TS 23.502 and TS 23.503 respectively.

The Network Slice Selection Function (NSSF) 922 is responsible to select the set of network slice instances serving the UE 904. It is believed the slicing will be introduced in phases, starting from the dedicated core with shared RAN 924 in 5G NSA, to the sliced core with shared RAN in 5G SA phase 1, and eventually to the sliced core and sliced RAN in 5G SA phase 2. More importantly, the evolution from shared resources to end-to-end network slicing will bring significant improvement to offer resources required by the media and entertainment verticals. A Network Exposure Function (NEF) 926 provides a similar function to a Service Capability Exposure Function (SCEF) in EPC Immaterial modifications may be made to the embodiments described here without departing from what is covered by the claims. For example, each of the databases or servers or other systems disclosed may be physical, virtual or cloud-based systems so long as each can implement the methods disclosed. In those cases where the systems are physical, the functionality described for each of the database or server or other systems may be implemented by a single piece of hardware at a specific location or may make use of multiple systems at separate locations. The databases and servers themselves may be provided together on a single piece of hardware or multiple pieces of hardware. The servers may include or be associated with one or more processors that may be of any configuration so long as they are able to carry out the methods disclosed. The databases may be any storage medium that can hold accessible data as described in the methods disclosed. The network systems described may be entirely digital or analog or a mixture of the two so long as the necessary connections may be made between devices. The servers may be any computing device, or virtual machine, or combinations thereof, that allows for the ability to store and analyze the data required to implement one or more of the methods described herein.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The invention claimed is:

1. A method of authenticating the location of a viewing device for receiving content, the method comprising:
storing a plurality of connection identifiers in a database, each of the plurality of connection identifiers being associated with a corresponding one of a plurality of networking devices, each of the plurality of networking devices being associated with one or more of a plurality of user accounts, each of the plurality of networking devices being installed permanently or semi-permanently in a location;
receiving a request from a viewing device to access content from a server, the request being associated with a user account;
identifying from the database one or more first connection identifiers of the plurality of connection identifiers associated with the user account to which the request is associated;
determining, from properties of a connection between the viewing device and the server, a second connection identifier of the plurality of connection identifiers, in which the second connection identifier is associated with a networking device involved in the connection;
determining if the second connection identifier matches one of the one or more first connection identifiers;
providing content to the viewing device if the second connection identifier matches one of the one or more of the first connection identifiers; and
denying the request from the viewing device to access content if the second connection identifier does not match any of the one or more of the first connection identifiers.

2. The method of claim 1 in which the second connection identifier is obtained by extracting data from the request.

3. The method of claim 2 in which the second connection identifier is included in the request.

4. The method of claim 1, in which the step of determining the second connection identifier further comprises:
obtaining information identifying the networking device involved in the connection from the properties of the connection between the viewing device and the server; and
obtaining the second connection identifier from the database or a second database based on the second connection identifier being associated with the networking device identified by the identifying information.

5. The method of claim 4 in which the information identifying the networking device is obtained by extracting data from the request.

6. The method of claim 5 in which the information identifying the networking device is included in the request.

7. The method of claim 4 in which the identifying information comprises one or more of an IP address, a serial number, or a media access control (MAC) address.

8. The method of claim 1 in which the one or more first connection identifiers are one of international mobile subscriber identities (IMSIs), international mobile equipment identities (IMEIs), MAC addresses, or a serial number of the networking device.

9. The method of claim 1 in which the one or more first connection identifiers are international mobile subscriber identities (IMSIs).

10. The method of claim 1 in which the networking device is a fixed wireless residential gateway.

11. The method of claim 1 in which receiving a request from a viewing device further comprises receiving access credentials from the viewing device, and in which the one or more first connection identifiers is associated with the access credentials.

12. A method of determining whether a user device is at a user's home, the method comprising:
storing a plurality of connection identifiers in a database, each of the plurality of connection identifiers being associated with a corresponding one of a plurality of networking devices, each of the plurality of networking devices being associated with one or more of a plurality of user accounts, each of the plurality of networking devices being installed permanently or semi-permanently in a location;

receiving, at a server, a request from a user device for a transaction to occur, the request being associated with a user account;

identifying from the database one or more first connection identifiers associated with the user account to which the request is associated;

determining, from properties of a connection between the user device and the server, a second connection identifier of the plurality of connection identifiers, in which the second connection identifier is associated with a networking device involved in the connection;

determining if the second connection identifier matches one of the one or more first connection identifiers;

allowing the requested transaction to occur if the second connection identifier matches the one or more of the first connection identifiers; and denying the request for the transaction to occur if the second connection identifier does not match any of the one or more of the first connection identifiers.

13. The method of claim 12 in which the second connection identifier is obtained by extracting data from the request.

14. The method of claim 13 in which the second connection identifier is included in the request.

15. The method of claim 13 in which the step of determining the second connection identifier further comprises:

obtaining information identifying the networking device involved in the connection from the properties of the connection between the user device and the server; and obtaining the second connection identifier from the database or a second database based on the second connection identifier being associated with the networking device identified by the identifying information.

16. The method of claim 12 in which the one or more first connection identifiers are international mobile subscriber identities (IMSIs).

17. A system for authenticating the location of a device, the system comprising:

one or more databases configured to:

store a plurality of connection identifiers, each of the plurality of connection identifiers being associated with a corresponding one of a plurality of networking devices, each of the plurality of networking devices being associated with one or more of a plurality of user accounts, each of the plurality of networking devices being installed permanently or semi-permanently in a location; and one or more servers configured to:

receive a request from a viewing device for a transaction to occur, the request being associated with a user account;

identify from the one or more databases one or more first connection identifiers associated with the user account to which the request is associated;

determine, from a connection between the viewing device and a server receiving the request, a second connection identifier of the plurality of connection identifiers, in which the second connection identifier is associated with a networking device involved in the connection;

determine if the second connection identifier matches one of the one or more first connection identifiers;

allow the requested transaction to occur if the second connection identifier matches one or more of the first connection identifiers; and deny the request for the transaction to occur if the second connection identifier does not match any of the one or more of the first connection identifiers.

18. The system of claim 17 in which the one or more servers is configured to obtain the second connection identifier by extracting data from the request.

19. The system of claim 18 in which during the step of determining the second connection identifier the one or more servers is further configured to:

obtain information identifying the networking device involved in the connection from properties of the connection between the viewing device and the server; and obtain the second connection identifier by selecting the second connection identifier from the one or more databases based on the second connection identifier being associated with the networking device identified by the identifying information.

20. The system of claim 17 in which the one or more servers being configured to receive a request from a viewing device for a transaction to occur further comprises being configured to receive a request from a viewing device to access content from a server and in which the one or more servers being configured to allow the requested transaction to occur if the second connection identifier matches one or more of the first connection identifiers further comprises the one or more servers being configured to provide content to the viewing device if the second connection identifier matches one of the one or more of the first connection identifiers.

* * * * *